United States Patent
Rittner et al.

(10) Patent No.: US 9,045,235 B2
(45) Date of Patent: Jun. 2, 2015

(54) SERVICE DEVICE, PASSENGER SERVICE UNIT, FUSELAGE OF AN AIRCRAFT, METHOD FOR INSTALLING THE SERVICE DEVICE

(71) Applicant: INTERTECHNIQUE, Plaisir Cedex (FR)

(72) Inventors: Wolfgang Rittner, Ahrensbok (DE); Hasso Weinmann, Lübeck (DE); Günter Boomgaarden, Scharbeutz (DE); Andreas Westphal, Eutin (DE); Rüdiger Meckes, Berkenthin (DE); Werner Granzeier, Stockeldorf (DE); Torsten Kanitz, Stockeldorf (DE); Hasko Rose, Stockeldorf (DE); Alexander Berschin, Stockeldorf (DE)

(73) Assignee: Zodiac Aerotechnics, Plaisir (FR)

( * ) Notice: Subject to any disclaimer, the term of this patent is extended or adjusted under 35 U.S.C. 154(b) by 35 days.

(21) Appl. No.: 13/955,214

(22) Filed: Jul. 31, 2013

(65) Prior Publication Data
US 2015/0036368 A1 Feb. 5, 2015

(51) Int. Cl.
*B64D 47/02* (2006.01)
*F21V 33/00* (2006.01)
*B60Q 3/02* (2006.01)

(52) U.S. Cl.
CPC ............ *B64D 47/02* (2013.01); *F21V 33/0092* (2013.01); *B60Q 3/0253* (2013.01)

(58) Field of Classification Search
CPC .. B60Q 2500/20; B60Q 3/0253; B60Q 3/025; B64D 13/00; B64D 2011/0053; B64D 2013/003; B64D 47/02; F21V 33/0092
See application file for complete search history.

(56) References Cited

U.S. PATENT DOCUMENTS

| 4,142,227 | A  | * | 2/1979 | Aikens | 362/480 |
| 7,527,402 | B2 | * | 5/2009 | Scown et al. | 362/480 |
| 8,100,547 | B2 | * | 1/2012 | Hogh et al. | 362/96 |
| 2008/0112155 | A1 | * | 5/2008 | Scown et al. | 362/96 |
| 2010/0093267 | A1 | * | 4/2010 | Hogh et al. | 454/76 |

FOREIGN PATENT DOCUMENTS

DE        19847884 A1    4/2000

OTHER PUBLICATIONS

EP Application No. 13178764.0, Search Report, Feb. 6, 2014, 9 pages.

* cited by examiner

*Primary Examiner* — Bao Q Truong
(74) *Attorney, Agent, or Firm* — Kilpatrick Townsend & Stockton LLP; Dean W. Russell; Renae Bailey Wainwright

(57) ABSTRACT

The invention relates to a service device having a system of a gasper module and a lighting module for a passenger service unit of an aircraft, comprising: a lighting source in a housing of the lighting module for providing light and a gasper orifice in a housing of the gasper module for supply of gasper air, wherein the lighting module and the gasper module are assembled in a housing assembly of the service device, wherein the housing assembly is adapted to hold the lighting module and the gasper module essentially around an axis (Z) of the housing assembly. According to the invention the lighting module and the gasper module are separated from each other by a housing assembly bearing part, and a force transmission is applicable to the lighting module and the gasper module for independent movement of at least one of the lighting module and the gasper module relative to the bearing part, and wherein the gasper module housing and the lighting module housing are separately form fitted to the bearing part by a positive locking.

27 Claims, 3 Drawing Sheets

SERVICE DEVICE, PASSENGER SERVICE UNIT, FUSELAGE OF AN AIRCRAFT, METHOD FOR INSTALLING THE SERVICE DEVICE

FIELD OF THE INVENTION

The invention relates to a service device having a system of a gasper module and a lighting module for a passenger service unit of an aircraft, according to the preamble part of claim 1. Further this invention relates to a passenger service unit comprising a service device and a fuselage of an aircraft comprising a passenger cabin and associated therewith a number of service devices. Furthermore this invention relates to a method for installing a service device.

BACKGROUND OF THE INVENTION

Cabin service systems are used to provide a number of services. The service can also use a passenger service unit which is widely used in aircrafts. A passenger service unit (PSU) offers comfort, control or safety modules, comprising generally a reading light, an attendant call light, a passenger air supply device, oxygen masks, warning lights and the like applications. In some aircrafts a passenger unit is provided for each seat of a passenger and crew member but providing of the service to a number of seats or rows together is also possible.

The seats of the passengers are normally arranged in rows and alleys wherein a row usually is aligned crosswise to an alley of seats; a row may have two, three, four, five or more seats depending on the size and the sections of an aircraft. The arrangement of a PSU is normally above a group of seats beneath the over-head panel and very close to each passenger's seat.

The number of cabin service arrangements, also the number of elements in a passenger service unit, increase for improving the comfort feeling of the passengers still provided in a limited space. For realizing the implementation of the elements also for an increased handling comfort the design of the elements has to be optimized.

In US 2008/0112155 A1 an integrated reading light and a personal air outlet for a passenger unit (PSU) is disclosed wherein a housing is employed carried in a PSU with an air nozzle mounted within the housing and a light ring of light emitting diodes mounted to the housing surrounding the air nozzles. The housing swivels in the PSU for orientation of a primary axis for directing a light beam from the LED light ring and the air nozzle separately swivels within the housing for orientation of a secondary axis for directing airflow from the nozzle.

Still, this kind of design for a combination of gasper air and reading light has drawbacks as to the handling comfort. It is desirable to improve comfort for the passenger but nevertheless appreciating an improved technical realization of combining both elements in one design and the technical implementation into the cabin of an aircraft.

SUMMARY OF THE INVENTION

An object of the invention is to provide an improved service device, a passenger service unit, a fuselage of an aircraft and a method of installing, wherein the service device has a system of a gasper module and a lighting module for a passenger service unit of an aircraft. In particular the invention is adapted for a technically improved supply of a service from the gasper module and the lighting module, in particular with increased comfort for the passenger and/or the flight attendant.

In relation to the service device the object of this invention is achieved by the service device as mentioned in the introduction and according to the invention further providing the features of the characterizing part of claim 1. Thus, the invention relates to a service device having a system of a gasper module and a lighting module for a passenger service unit of an aircraft, comprising:
  a lighting source in a housing of the lighting module for providing light and a gasper orifice in a housing of the gasper module for supply of gasper air, wherein
  the lighting module and the gasper module are assembled in a housing assembly of the service device, wherein the housing assembly is adapted to hold the lighting module and the gasper module essentially around an axis, in particular a common axis, of the housing assembly.

According to the invention,
the lighting module and the gasper module are separated from each other by a housing assembly bearing part, and
  a force transmission is applicable to the lighting module and the gasper module for independent movement of at least one of the lighting module and the gasper module relative to the bearing part, and wherein
  the gasper module housing and the lighting module housing are separately form fitted to the bearing part by a positive locking.

In particular the positive locking as such is accomplished without any additional fixing elements.

The invention also leads to a passenger service unit (PSU) comprising the service device wherein the service device is integrated in the passenger service unit (PSU).

The invention also leads to a fuselage of an aircraft comprising a passenger cabin and associated therewith a number of service devices, in particular wherein the service device is—partly or in total—integrated in an associated passenger service unit.

In relation to the method the object is achieved by a method for installing a service device for at least one passenger seat of an aircraft, the service device being adapted in a PSU, wherein the gasper module housing and the lighting module housing are form fitted in the housing; in particular by use of a special die-tool.

Thus basically, this invention provides a device and a method based on a service device having a system of a gasper module and a lighting module wherein the lighting module and the gasper module are separated from each other by a housing assembly bearing part and wherein said modules are separately form fitted to the bearing part by a positive locking. Advantageously the positive locking is without any additional fixing elements. According to the invention a force transmission is applicable to the lighting module and the gasper module for independent movement of at least one of the lighting module and the gasper module relative to the bearing part.

The invention starts from the consideration that in the prior art design mentioned in the introduction swivelling of the first service element with the reading light ring will cause movement of the second service element with the direction of the reading light beam; only by holding the first element, the second element can be swivelled in the second desired direction without changing the first desired direction.

The invention recognized that it is desirable to operate easily a combined service device for an increased comfort of the passenger but nevertheless achieving a reduced space requirement. This invention thus provides an inventive concept of a system of gasper module and a lighting module wherein the lighting module and the gasper module are assembled in a housing assembly of the service device wherein nevertheless the lighting module and the gasper module are separated from each other by a housing assembly bearing part. By separating the lighting module and the gasper module a swivelling of each module will be possible e.g. without influencing or changing the position of the other module. The separating e.g. allows keeping the position of one of the modules even though the other one is moved. The design of the housing assembly allows an independent movement of each module by applying a force transmission. Because of the housing assembly and the arrangement around an axis—in particular wherein the axis is a common axis of the bearing part and the modules at least in a straight down aiming position—the integration of the lighting module and the gasper module reduces the space requirements for the service device but still keeps the comfort feeling by having both modules being separately integrated in the PSU.

The direction of a light beam provided can be offered by a light beam which is possibly deflected such that the position of the light beam meets a passenger's demands. Either for having light (e.g. while eating in front of the passenger seat) or for reading (e.g. while laying), the light beam can be deflected in a position the passenger wants to have it; also the light beam can be directed to a side, e.g. a left or a right side. An individual movement extends to the deflection, rotation, pivoting and/or swivelling in each position which is near a passenger seat up to the comfort demands of the passenger.

An arrangement of a lighting module around a gasper module—but still arranged around a preferably common axis—expands a light cone which is in the interest of the passenger. An arrangement of the gasper module around the light module—but still arranged around a preferably common axis—is also possible. This would allow an increased gasper air volume which might be preferred in the alternative. Both arrangements of a gasper and lighting module are possible.

The invention further recognized that in some situations during a flight the supply of gasper air and the supply of light can be individually different for each passenger; the providing itself and intensity of gasper air and light may depend on the individual demands of a passenger. An individual setting of each module in service device is possible and furthermore the invention enables an easy handling for a large setting range of each module. E.g. holding of a book in the left hand affords a light cone direction to the open book which might be not the direction of the gasper air. The inventive concept allows changing the direction of gasper air but with the advantageous step of an easy handling of the gasper module so that only one operating hand is needed to change the direction. In the state of art typically the setting and the range of setting are limited and the setting itself, especially a force transmission, requires two hands for swivelling only one service element in the desired direction. The service device according to the invention integrates in the housing of the service device a bearing part for independent movement in each desired direction by a separated force transmission.

Still further this invention recognized that the bearing part is to enable a positive locking of each of the gasper and lighting module. This positive locking is realized by a formfitting. Advantageously there is no need for an additional fixing element. Formfitting in the context of this invention in particular means to be designed to fit snugly around a given shape, which can also be described by close-fitting. Next to the positive locking which increases the degrees of freedom for operating the form fitting reduces the rattling or clattering of the housing assembly and the modules which decreases the noises during flight and increases the comfort of the passengers.

The installation and maintenance of the service device according to this invention are more easy because of the positive locking and each module can be installed and repaired separately. Also, a reduced number of parts and fixing elements decreases installation time and reduces the amount of maintenance service. It is to be understood that the service device in particular can be an implementation of further different services modules with an improved concept for an easy handling and high amount of setting positions.

These and further developed configurations are further outlined in dependent claims. The mentioned advantages of the proposed concept are even more improved. For each feature of the dependent claims it is claimed independent protection independent from all other features of this disclosure.

In a preferred development it has been recognized to be of convenience when the housing assembly comprises a further housing for the independent movement and for the easy installing of each module and the service device itself. In particular by providing an outer ring housing and an inner ring housing the housing assembly can offer different separated housings for the positive locking and the independent movement. The inner ring housing can have a bearing part and the outer ring housing can have a further bearing part, the further bearing part having an inner bearing ring surface engaging an outer curved ring surface of the lighting module housing. The dimension of the inner and outer housing can be selectively adjusted in dependence on the design of the lighting module.

In a preferred development a form fitting is at an outer curved ring surface of the gasper module housing and the outer curved ring surface follows at length along an inner bearing ring surface of the bearing part. Additionally an inner curved ring surface of the lighting module housing preferably follows at length along an outer bearing ring surface of the bearing part. In particular a distance part can be provided between at least one of the bearing ring surfaces at distance to the respective curved ring surfaces. The form fitting which comprises a closefitting is described in this development for each module and offers the opportunity for positive locking and flexible movement in deflected deposition without rattling during flight. The curved surface allows an easy handling and a smooth sliding creating a high angle for deflection.

In a preferred development respectively one single engagement line of the engaging ring surface assigned to the gasper module housing extends without spacing to the bearing part at length along the common axis. Additionally or alternatively respectively at least one single engagement line of the inner and/or outer engaging ring surfaces assigned to the lighting module housing extends without spacing to the bearing part and/or further bearing part at length along the common axis.

In a preferred development the positive locking makes use of a first extremal point of an outer curved ring surface of the gasper module housing. In other words, a line of positively locking extends to and from said extremal point. Said the extremal point exceeds the inlet of an inner bearing ring of the bearing part; in other words, the extremal point is located at a peripheral outer position as compared to the inlet of an inner bearing ring of the bearing part.

Additionally or alternatively the positive locking makes use of a second extremal point of an outer curved ring surface of the lighting module housing. In other words, a line of positively locking extends to and from said extremal point. Said extremal point exceeds the inlet part of an outer bearing ring surface of a bearing part; in other words, the extremal point is located at a peripheral outer position as compared to the inlet part of an outer bearing ring surface of a bearing part.

Additionally or alternatively a surface of translucent inner ring is reproducing a single engagement line to the outer bearing ring curved surface of the bearing part having a extremal point wherein the extremal point coincides with a reversal point for a surface of the translucent inner ring in a position wherein the lighting module and the gasper module are aligned along an axis of the service device.

In a preferred development a middle engagement line and an outermost engagement line form a two sided conically closing intake between the bearing part and the further bearing part for acceptance of the lighting module housing. The arrangement of the light sources on a light source ring can be described by cutting a cross section. An advantageous design of the service device uses a conically closing intake between the bearing part and the further bearing part, which compresses the place by having an optimized function and reduces the space requirement of the housings while having a optimized deflection and independent movement.

In a preferred development the concentrically separated modules comprise a pivot line in the housing assembly for adapting a rotary and/or swivelling and/or pivoting movement of the form fitted modules. A rotating and/or swivelling and/or pivoting of the lighting module nevertheless allows a gasper module to be rotated and/or swivelled and/or pivoted according to the flexible seating positions of each passenger. E.g. by changing a seating position while sleeping or eating the direction of gasper air or light will change. A rotating and/or swivelling and/or pivoting along a pivot line offers the opportunity to increase the comfort of the passenger but also for the neighbours because of the individual position without harass the surrounding seats.

In a particular preferred development the concentrically separated gasper module housing comprise a pivot point for adapting a rotary and/or swivelling and/or pivoting movement of the form fitted gasper module and a slew round with an angle of from $-60°$ to $+60°$, in particular of from of $-45°$ to $+45°$ in particular of from of $-25°$ to $+25°$, in particular of from of $-15°$ to $+15°$, relative to the axis, in particular the common axis (Z), for producing a gasper air volume in a deflected position by force transmission, which will be determined by the design of the outer ring and inner ring housing and the lighting module. The large angle offers a high variety of deflection position which can be easily handled by the passengers without larger joint effort and a precise positioning. Also this allows a comfortable setting if the cabin will change seat number per row.

A high flexibility for the passenger and the cabin interior and an accurate setting of the passenger also applies to a particular preferred development wherein the concentrically separated lighting module housing comprises a pivot point in the housing assembly for adapting a rotary and/or swivelling and/or pivoting movement of the lighting module and a slew round with an angle of from $-60°$ to $+60°$, in particular of from of $-45°$ to $+45°$, in particular of from of $-25°$ to $+25°$, in particular of from of $-15°$ to $+15°$, to the axis, in particular to the common axis (Z), for producing a light cone in a deflected position by force transmission.

In a particular preferred development it has to be recognized that the limited space in the passenger cabin needs to integrate more device elements in a service device. Because of the compact optimizes function of the service device of this invention the lighting module is adapted to provide a reading light and a cabin attendant call light. This means that the lighting module adapts a reading light unit and colour light unit for signalling an attendant, in particular with the units being arranged on a printed circuit board (PCB). The reading light unit and the colour light unit can be arranged for separate switching and operating the reading light and the cabin attendant call light. The cabin attendant call light can be switched on by the passenger or can change its colour for visualizing the call. The integration in the service device optimized the needed space but also increase the visibility of the sign for the flight attendant which can the call clearly identify because of the exact mapping.

For visualizing in a preferred development the lighting module adapts a translucent inner ring for visualizing the attendant call light integrated in the lighting module being independent from the reading light. This structural feature highlights the advantageous designs of the service device because of an optimized integration on a compact installation of the cabin attend call light. Because of the lighting modules, which preferably surround the swivelling gasper modules, the space between reading light and the deflection place will be optimized used for the cabin attend call light. By a translucent inner ring the colour light unit can be placed on a common printed circuit board (PCB) with a reading light. Nevertheless the colour light will be visible separately from the reading light because of the barrier in between. The colour is then visible in the inner ring of lighting module and can be swivelled with the lighting module.

In a particular preferred development the gasper module is throttled by a die exit arranged in the inner part of inner ring housing. This development increases the comfort of the passenger because the adjusting of the gasper air volume is displaced inside of the gasper module and the inner housing of the housing assembly by a constructive feature. The setting will be done by the passenger at the orifice of the gasper module but the opening of the nozzle will be closed or open by the die exit in the inner part of the gasper module. This reduces the noises of the gasper module In a preferred development the concentrically separated module housings are form fitted installed in the housing assembly. In particular a special die-tool can be provided which will be used for the mounting holes. The special die-tool is preferred because of the positive locking so that the individual components clamp to each other in a positive locking relationship.

A further preferred development of a method for installing a service device for at least one passenger seat of an aircraft adapted in a PSU uses the gasper module housing and the lighting module housing formfitted in the housing by a special die-tool. This method is an easy way for handling this service device and it provides a successful implementation of a simplified device.

In a preferred development a passenger service unit (PSU) comprises a service device wherein the service device is integrated in the PSU. This reduces a space needed for the device elements and increases the comfort of the passenger because of the simplified handling and variety of possibilities of settings for each of the gasper and reading light. In a preferred development a fuselage of an aircraft comprises a passenger cabin and associated therewith a number of service devices.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality. The wording, "a number of" items, comprises also the number one, i.e. a single item, and further numbers like two, three, four and so forth.

BRIEF DESCRIPTION OF THE DRAWINGS

The drawing shows in.

DETAILED DESCRIPTION OF THE DRAWINGS

Figures 1A, 1B:
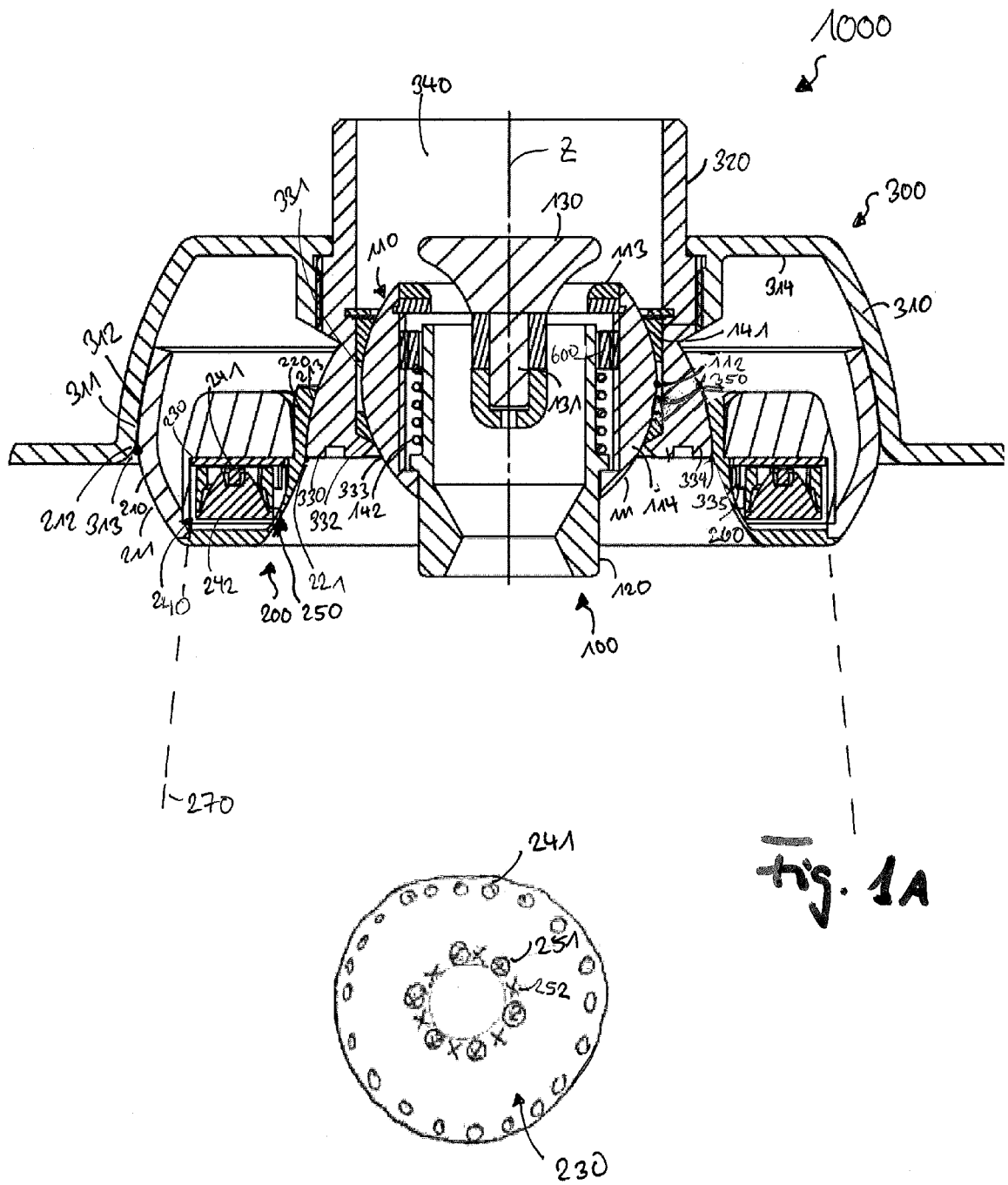
FIG. 1A: a preferred embodiment a cross section of a service device.
FIG. 1B: a detail of FIG. 1A a simplified scheme of a part of the lighting module.

In FIG. 1A a service device 1000 is depicted. The service device has a system of a gasper module 100 and a lighting module 200 for a passenger service unit of an aircraft assembled in a housing assembly 300, wherein the housing assembly is adapted to hold the lighting module and the gasper module essentially around a common axis of the housing assembly.

The lighting module 200 is adapted for providing light, especially the reading light for the passenger and in this preferred embodiment also an attendant call light. A gasper orifice 120 in a housing 110 of the gasper module is adapted for supplying of gasper air. The gasper module is arranged in the middle of the service device. Around the gasper module the lighting module is arranged, being held by the housing assembly.

The housing assembly 300 comprises an outer ring housing 310 and an inner ring housing 320, the inner ring housing having the bearing part 330 and the outer ring housing having a further bearing part 311. The further bearing part has an inner bearing ring surface 312 engaging an outer curved ring surface 211 of the lighting module housing. The lighting module 200 and the gasper module 100 are separated from each other by a housing assembly bearing part 330. Because of the separation the service function of each module can be adjusted individually corresponding to individual settings of each passenger.

The design of the service device 1000 of this preferred embodiment is adapted in such a manner that an outer curved ring surface 111 of the gasper module housing follows form fitted at length along an inner bearing ring surface 332 of the bearing part with a distance part there between. In the distance part 350 sealing elements 141 are integrated for tightening housing assembly 300 so that the gasper air passes the die exit 130 for giving a controlled flow of gasper air through the orifice 120. Form fitting has the meaning of being designed to fit snugly around a given shape, which is also referred to as closefitting. Additionally here an inner curved ring surface 213 of the lighting module housing follows form fitted at length along an outer bearing ring surface 335 of the bearing part at least with a distance part there between. In this preferred embodiment it is form fitted in such a way that a single engagement line of the inner engaging ring surfaces 421 assigned to the lighting module extends without spacing to the bearing part 330 and a single engagement line of the outer engaging ring surfaces 422 assigned to the lighting module housing extends to the bearing part 311 at length along the common axis without spacing.

The gasper module housing 110 and the lighting module housing 210 are separately form fitted to the bearing part 330 by a positive locking wherein the positive locking is without any additional fixing elements. The positive locking is extends to a extremal point of an outer curved ring surface 112 of the gasper module housing wherein the extremal point exceeds the inlet of an inner bearing ring 333 of the bearing part. The gasper module housing has a spherical general partly ball or elliptical shaped outer form, which can be also be describe as being a form of a spherical calotte. This means that the gasper module housing 110 can be externally pushed into the housing assembly and thereby can be locked in that place by the bearing part 330.

The extremal point of an outer curved ring surface 211 of the lighting module housing exceeds the inlet part of an outer bearing ring surface 313 of a bearing part. The surface of the translucent inner ring 220 is reproducing a single engagement line to the outer bearing ring curved surface 335 of the bearing part having the extremal point wherein the extremal point is in coincidence with an reversal point 221 for the surface of the translucent inner ring; in the position shown in FIG. 1A at least. This means that the lighting module housing 210 can be externally pushed into the housing assembly especially in the outer ring housing 310 and can be locked in that place by the bearing parts 311 and 330.

Thus, here the concentrically separated module housings can form fitted installed in the housing assembly by use of a special die-tool designed for the mounting hole 600 for moving the gasper module housing 210 in the housing assembly 300. The moving in exceeds the extremal point of an outer curved ring surface 112 and enables the positive locking of the service device and its integrated modules. This construction is advantageous for independent movement of at least one of the lighting module and the gasper module relative to the bearing part. Because of the pivot line in the housing assembly the concentrically separated modules enable a rotary movement of the form fitted modules.

The gasper module 100 is throttled by a die exit 130 arranged in the inner part 340 of inner ring housing 320. In this preferred embodiment the die exit 130 is on maximum stop means such that the gasper air has the maximum volume flow. By rotating the orifice 120 around the pivot line the volume flow can be reduced. The orifice 120 is surrounded by a spring 142 in the inner part of the gasper module housing 114. If the orifice 120 is to be rotated, the die exit 130 will be rotated in the other direction in the inner thread part 131 of the die exit; thus this will close the die exit and the gap for passing gasper air will be reduced. A closed position is achieved when the die exist 130 sits on the seal seat 113. The adjustment in the inner part 340 of the housing assembly reduces the noises of the ventilation and additionally increases therefore the comfort of the passenger besides the individual setting of the direction of the gasper air and of the volume flow.

In the following for identical or equivalent items or items of identical or equivalent function the same reference marks are used. For corresponding features it is referred to the above description.

As shown in FIG. 1B, and as will be described in more detail below, in this preferred embodiment the lighting module 200 is adapted to provide a reading light and a cabin attendant call light. For this case the lighting module adapts a light, especially white light, by an LED 241 for a light projection in form of a light cone 270 transmitted through a lens 242. Additionally the lighting module adapts colour light unit 250 arranged on a PCB 230 for signalling an attendant call. The translucent inner ring 220 for visualizing the attendant call light integrated in the lighting unit is independent from the reading light because of the installed barrier 260. The colour light unit 250 offers the possible by pushing the attendant call button to change the colour of the colour light unit 250 par example from blue light to red light, so that the service device 1000 has also the function of signalling also the attend call by visualizing a colour change the inner ring of the inner housing.

In FIG. 1B a schematic view of an arrangement of the light sources on a PCB is depicted which is part of the lighting module 200. In the outer ring LEDs 241, especially white light LEDs, are arranged around the inner ring of blue light LEDs 251 and red light LEDs which are alternating arranged. The PCB is integrated in the lighting module housing 210. Adapted constructive devices as the barrier 260 ensure that the reading light by the outer ring of LEDs is transmitted through the lens 241 and is adapted in form of a light cone 270. The inner light ring is adapted to signalling the attend call light. Because of the barrier 260 the colour will be not mixed with the reading light and will not change the light bone or the light colour. The colour light is emitted by translucent inner ring 220 of the inner ring of the housing and colorized the inner ring around the orifice 120. By pushing a button the colour light can be switched from blue to red and visualize the attend call very clearly for the flight attendant. This improves the seat assignment of the calling passenger.

Figure 2:
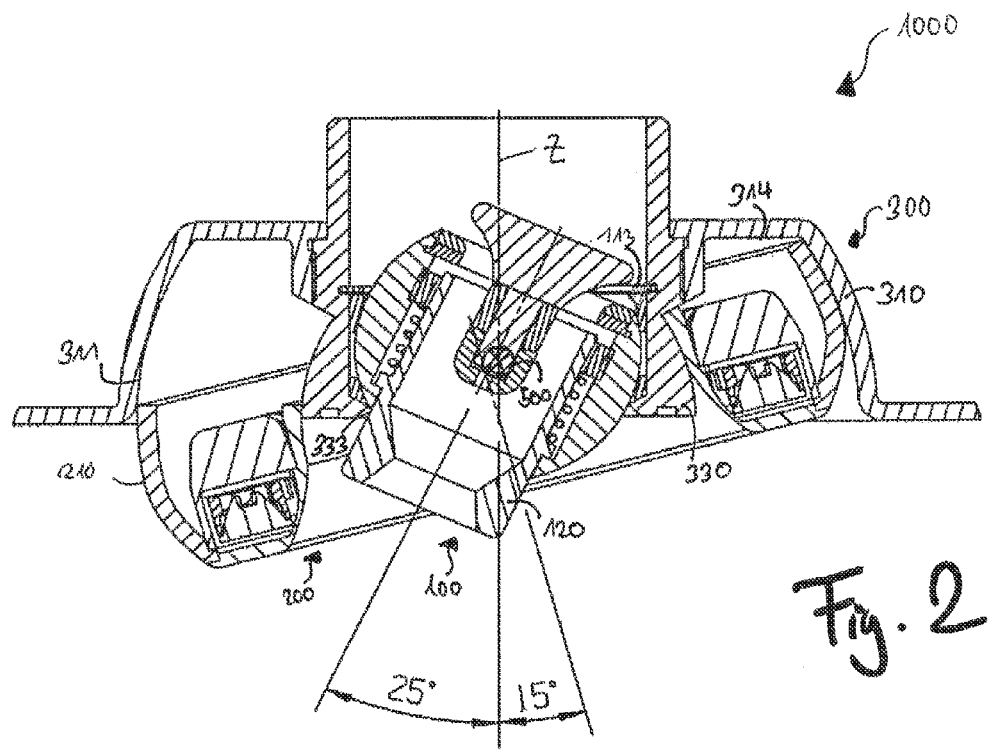
FIG. 2: an embodiment a simplified scheme of a service device in a deflected position.

As shown in FIG. 2, and as will be described in more detail below, the concentrically separated gasper module housing comprise a pivot point for adapting a rotary or the like movement of the form fitted gasper module 100 and a slew round 500, here with an angle of from −25° to +25° to the common axis Z. A force transmission is applicable to the lighting module and the gasper module for independent movement of at least one of the lighting module and the gasper module relative to the bearing part. For producing a light cone 270 in a deflected position by force transmission a concentrically separated lighting module housing comprises a pivot point in the housing assembly for adapting a rotary movement of the lighting unit and a slew round 500, here with an angle of from −15° to +15° to the common axis Z for producing a light cone 270 in a deflected position by force transmission. Depending of the passenger's setting, the light cone 270 can be changed to each position par example for eating while sitting, for reading while laying and the like.

The construction of the flexible movement independent of the setting of the other module is shown in FIG. 2. The service device 1000 as depicted here and, as compared to FIG. 1A, the service device is in the pivoted status. This embodiment highlights the function of the service device. Because of the pivot point in the housing assembly 300 the concentrically separated gasper module 100 and light module 200 enable a rotary movement of the form fitted modules. By force transmission the position of the modules is changed relative to the bearing part. In this embodiment the concentrically separated lighting module housing 210 has a slew round 500 with an angle of +15° to the common axis Z. Thus a light cone 270 is produced in a deflected position more preferred on one side of the seat when the service device is directly installed over the passenger seat in the overhead panel of a PSU. The concentrically separated gasper module housing 110 has a slew round 500 with an angle of from −25° to the common axis Z opposing to the lighting module so that there is a change in between the modules about 40°.

The maximum tilting angle is defined within the margins given by the housing assembly 300. The outer ring housing 310 is formed in a way such that the maximum tilting angle of the lighting module housing and its outer curved ring surface 211 is at 15°; thus lighting module housing can be blocked by the top of outer ring housing 314. The tilting of gasper module housing 110 with the flanged orifice 120 can be blocked by the inlet of the inner bearing ring surface 333 so that the maximum tilting angle of the gasper module housing 110 depends on the design of the bearing part and its element.

In this embodiment the die exit is opened to a maximum. In this picture the maximum position of the die exit 130 with the highest volume flow is visible. In its maximum position the surface of the die exit 132 approaches to the surface of the seat on one side. This maximum position means that the maximum possible volume of gasper air is directed on the passenger seat and in this case it will be directed on the passenger's seat with a deflected angel position of −25°. The independent movement relative to the bearing part increases the flexibility of the passenger because of the individual setting of the gasper air and the light, provided and set individual depending on the passengers comfort. Because of the positive locking of each module 100 and 200 in each position the modules are safely locked in the housing assembly 300, the bearing part 330 and the bearing part of the outer ring housing 311 lock the modules in a flexible way which is advantageous over the state of art.

Figure 3:
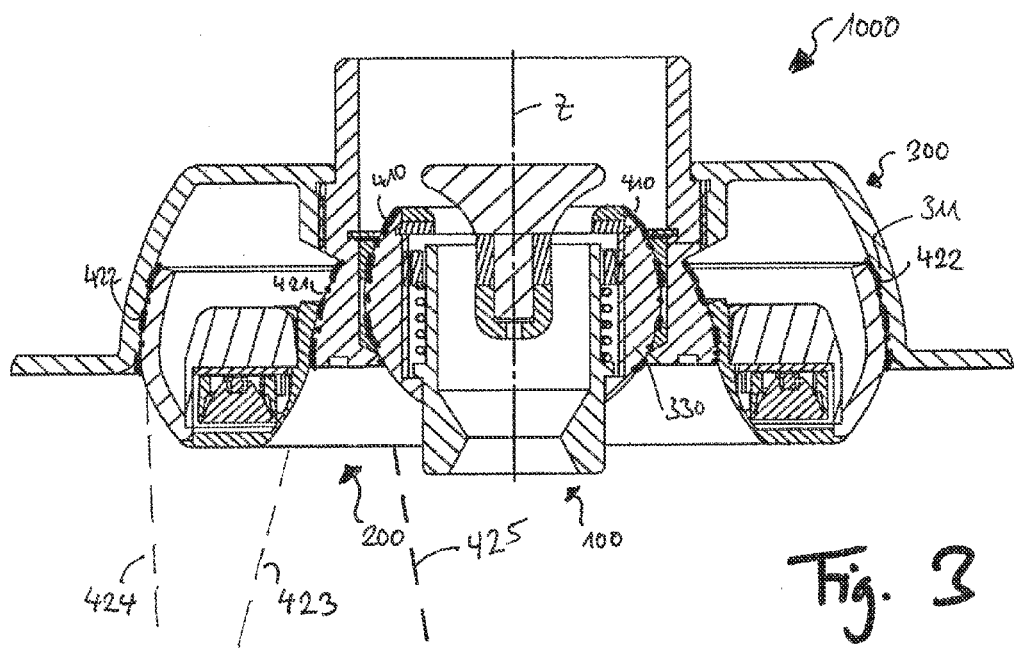
FIG. 3: a third embodiment a simplified scheme of the visualized design elements.

The form fitting of the gasper module 100 and the lighting module 200 relative to the bearing part of the service device 1000 is shown in FIG. 3. One nearly single engagement line 410 (dashed curved line) of the engaging ring surface assigned to the gasper module housing extends without spacing to the bearing part at length along the common axis.

Another single engagement line of the inner engaging ring surfaces 421 (dashed curved line) and outer engaging ring surfaces 422 (dashed curved line) assigned to the lighting module housing extends without spacing to the bearing part 330 and to the further bearing part 311 at length along the common axis.

In a figurative sense the formfitting and the positive locking can be described by design elements that an innermost engagement line 425 and a middle engagement line 423 form a two sided conically closing intake between the inner bearing ring surface 332 and the outer ring bearing surface 335 of the bearing part 330. A middle engagement line 423 and an outermost engagement line 424 form a two sided conically closing intake between the bearing part and the further bearing part for acceptance of the lighting module housing.

Figure 4:
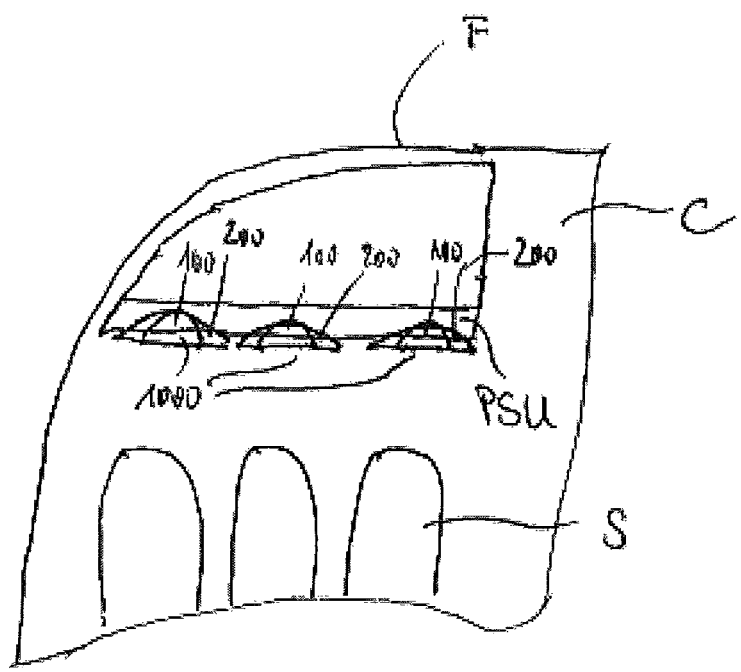
FIG. 4: a fuselage of an aircraft wherein in a cabin seats for passengers are each assigned to a service device of the preferred embodiment.

FIG. 4 depicts the situation of a fuselage F of an aircraft A wherein in a cabin C seats for passengers are arranged in a row and an alley wherein the row is aligned crosswise to the alley of seats and three seats S of a row are shown. Each passenger seat S is assigned to a service device 1000 wherein a gasper module 100 and a lighting module 200 are form fitted relative to the bearing part thereof.

LIST OF REFERENCE

1000 service device
100 gasper module
110 gasper module housing
111 outer curved ring surface of the gasper module housing 112 extremal point of an outer curved ring surface of the gasper module housing
113 seal seat
114 inner part of the gasper module housing
120 orifice
130 die exit
131 thread part
132 surface of the die exit
141 sealing elements
142 spring
200 lighting module
210 Lighting module housing
211 Outer curved ring surface of lighting module housing
212 extremal point of an outer curved ring surface of the lighting module housing
213 inner curved ring surface of the lighting module housing
220 translucent inner ring
221 reversal point
230 PCB
240 Reading light unit
241 LED
242 lens
250 color light unit
251 blue light
252 red light
260 barrier
270 light cone
300 housing assembly
310 outer ring housing
311 bearing part of outer ring housing
312 inner bearing surface of outer ring housing
313 inlet of an outer bearing ring surface of a bearing part
314 top of the outer ring housing
320 inner ring housing
330 bearing part
331 inner bearing ring
332 inner bearing ring surface of the bearing part
333 inlet of an inner bearing ring surface of the bearing part
334 outer bearing ring
335 outer bearing ring curved surface of the bearing part
340 inner part
350 distance part
400 single engagement line
410 engaging ring surface assigned to the gasper module housing
421 single engagement line of the inner engaging ring surfaces assigned to the lighting module housing
422 single engagement line of the outer engaging ring surfaces assigned to the lighting module housing
423 middle engagement line
424 outermost engagement line
425 innermost engagement line
500 slew round
600 mounting hole
A aircraft
S seat
F fuselage
C cabin
Z axis

The invention claimed is:

1. A service device having a gasper module and a lighting module for a passenger service unit of an aircraft, the service device comprising:
a lighting source in a lighting module housing for providing light; and
a gasper orifice in a gasper module housing for supplying gasper air, wherein
the lighting module and the gasper module are assembled in a housing assembly of the service device, wherein the housing assembly is adapted to hold the lighting module and the gasper module substantially around an axis of the housing assembly,
wherein:
the lighting module and the gasper module are separated from each other by a housing assembly bearing part;
a force transmission is applicable to the lighting module and the gasper module for independent movement of at least one of the lighting module and the gasper module relative to the housing assembly bearing part;
the gasper module housing and the lighting module housing are separately form fitted to the housing assembly bearing part by a positive locking; and
wherein the housing assembly comprises an outer ring housing and an inner ring housing, the inner ring housing having the housing assembly bearing part and the outer ring housing having a further housing assembly bearing part, the further housing assembly bearing part having an inner bearing ring surface engaging an outer curved ring surface of the lighting module housing.

2. The service device according to claim 1 wherein the form fitting of the gasper module housing and the lighting module housing to the housing assembly bearing part is at:
an outer curved ring surface of the gasper module housing such that the form fitting follows at least partially along a length of an inner bearing ring surface of the housing assembly bearing part; and
an inner curved ring surface of the lighting module housing such that the form fitting follows at least partially along a length of an outer bearing ring surface of the housing assembly bearing part; and
wherein
a distance part is positioned between at least one of the inner and outer bearing ring surfaces of the housing assembly bearing part and the respective curved ring surface.

3. The service device according to claim 1 wherein at least one of:
a single engagement line of an engaging ring surface of the gasper module housing extends without spacing to the housing assembly bearing part at least partially along a length of the axis of the housing assembly;
a single engagement line of an inner engaging ring surface of the lighting module housing extends without spacing to the housing assembly bearing part at least partially along the length of the axis of the housing assembly; and
a single engagement line of an outer engaging ring surface of the lighting module housing extends without spacing to the further housing assembly bearing part at least partially along the length of the axis of the housing assembly.

4. The service device according to claim 1 wherein the positive locking makes use of:
an extremal point of an outer curved ring surface of the gasper module housing, wherein the extremal point exceeds an inlet of an inner bearing ring of the housing assembly bearing part, wherein the extremal point of the outer curved ring surface of the gasper module housing corresponds to a widest part of the gasper module housing; and
an extremal point of the outer curved ring surface of the lighting module housing, wherein the extremal point exceeds an inlet part of an outer bearing ring surface of the housing assembly bearing part, wherein the extremal point of the outer curved ring surface of the lighting module housing corresponds to a widest part of the lighting module housing.

5. The service device according to claim 1 wherein a middle engagement line between an outer curved ring surface of the gasper module housing and an inner bearing ring surface of the housing assembly bearing part and an outermost engagement line between an outer curved ring surface of the lighting module housing and an inner bearing ring surface of the further housing assembly bearing part form a two sided conically closing intake between the housing assembly bearing part and the further housing assembly bearing part for acceptance of the lighting module housing.

6. The service device according to claim 1 wherein the lighting and gasper modules comprise a pivot line in the housing assembly for adapting a rotary movement of the form fitted modules.

7. The service device according to claim 1 wherein the gasper module housing comprises a pivot point for adapting a pivoting movement of the form fitted gasper module and a slew round with an angle of from of approximately −60° to approximately +60° relative to the axis of the housing assembly for producing an air gasper volume in a deflected position by the force transmission and such that the gasper module can be rotated upon the axis.

8. The service device according to claim 1 wherein the lighting module housing comprises a pivot point in the housing assembly for adapting a pivoting movement of the form fitted lighting module and a slew round with an angle of from approximately −45° to approximately +45° relative to the axis of the housing assembly for producing a light cone in a deflected position by the force transmission.

9. The service device according to claim 1 wherein the lighting module comprises a reading light unit and a color light unit for signalling an attendant call, wherein the reading light and color light units are arranged on a printed circuit board.

10. The service device according to claim 1 wherein the lighting module comprises a translucent inner ring for allowing the emission of light from an attendant call light integrated in the lighting module.

11. The service device according to claim 1 wherein the gasper module comprises a die exit arranged in an inner part of the inner ring housing of the housing assembly.

12. A method for installing the service device as claimed in claim 1 in connection with at least one passenger seat in the aircraft.

13. Passenger service unit comprising the service device according to claim 1 wherein the service device is integrated in the passenger service unit.

14. A fuselage of an aircraft comprising a passenger cabin and a number of the service devices according to claim 1.

15. The service device according to claim 1 wherein the positive locking is accomplished without any additional fixing elements.

16. The service device according to claim 1 wherein a surface of a translucent inner ring abuts an outer bearing ring curved surface of the housing assembly bearing part, the housing assembly bearing part having an extremal point that coincides with a reversal point of the surface of the translucent inner ring when the lighting module and the gasper module are aligned along the axis of the housing assembly, wherein the extremal point of the housing assembly bearing part corresponds to a widest part of the housing assembly bearing part.

17. A service device having a gasper module and a lighting module for a passenger service unit of an aircraft, the service device comprising:
　a lighting source in a lighting module housing for providing light; and
　a gasper orifice in a gasper module housing of the gasper module for supplying gasper air, wherein:
　　the lighting module and the gasper module are assembled in a housing assembly of the service device substantially around an axis of the housing assembly;
　　the lighting module and the gasper module are separated from each other by a housing assembly bearing part;
　　at least one of the lighting module and the gasper module is configured to move independently relative to the housing assembly bearing part; and
　　the gasper module housing and the lighting module housing are separately form fitted to the housing assembly bearing part by a positive locking at:
　　　an outer curved ring surface of the gasper module housing such that the form fitting follows at least partially along a length of an inner bearing ring surface of the housing assembly bearing part; and
　　　an inner curved ring surface of the lighting module housing such that the form fitting follows at least partially along a length of an outer bearing ring surface of the housing assembly bearing part, and
　　wherein a distance part is positioned between at least one of the inner and outer bearing ring surfaces of the housing assembly bearing part and the respective curved ring surface.

18. The service device according to claim 17 wherein the distance part is positioned between the outer curved ring surface of the gasper module housing and the inner bearing ring surface of the housing assembly bearing part.

19. The service device according to claim 17 wherein the distance part is positioned between the inner curved ring surface of the lighting module housing and the outer bearing ring surface of the housing assembly bearing part.

20. The service device according to claim 17 wherein the distance part is a translucent ring.

21. The service device according to claim 17 wherein the positive locking is accomplished without any additional fixing elements.

22. A service device having a gasper module and a lighting module for a passenger service unit of an aircraft, the service device comprising:
　a lighting source in a lighting module housing for providing light; and
　a gasper orifice in a gasper module housing of the gasper module for supplying gasper air, wherein:
　　the lighting module and the gasper module are assembled in a housing assembly of the service device substantially around an axis of the housing assembly;
　　the lighting module and the gasper module are separated from each other by a housing assembly bearing part;
　　at least one of the lighting module and the gasper module is configured to move independently relative to the housing assembly bearing part;
　　the gasper module housing and the lighting module housing are separately form fitted to the housing assembly bearing part by a positive locking; and
　　a surface of a translucent inner ring engages an outer bearing ring curved surface of the housing assembly bearing part, the housing assembly bearing part having an extremal point that coincides with a reversal point of the surface of the translucent inner ring when the lighting module and the gasper module are aligned along the axis of the housing assembly, wherein the extremal point of the housing assembly bearing part corresponds to a widest part of the housing assembly bearing part.

23. The service device according to claim 22 wherein the positive locking is accomplished without any additional fixing elements.

24. The method of claim 12 further comprising using a die-tool to form fit the gasper module housing and the lighting module housing in the housing assembly.

25. The service device according to claim 2 wherein the distance part is positioned between the outer curved ring surface of the gasper module housing and the inner bearing ring surface of the housing assembly bearing part.

26. The service device according to claim 2 wherein the distance part is positioned between the inner curved ring surface of the lighting module housing and the outer bearing ring surface of the housing assembly bearing part.

27. The service device according to claim 2 wherein the distance part is a translucent ring.

\* \* \* \* \*